Jan. 16, 1962       W. F. STREMKE ET AL       3,016,671
            WRAPPING MACHINE WITH RETURN CONVEYOR
Filed Sept. 25, 1959                          7 Sheets-Sheet 1

INVENTORS
WILLIAM F. STREMKE
WILLIAM F. STREMKE, JR
BY ROMAN R. PAZDERSKI

Wheeler, Wheeler & Wheeler
ATTORNEYS

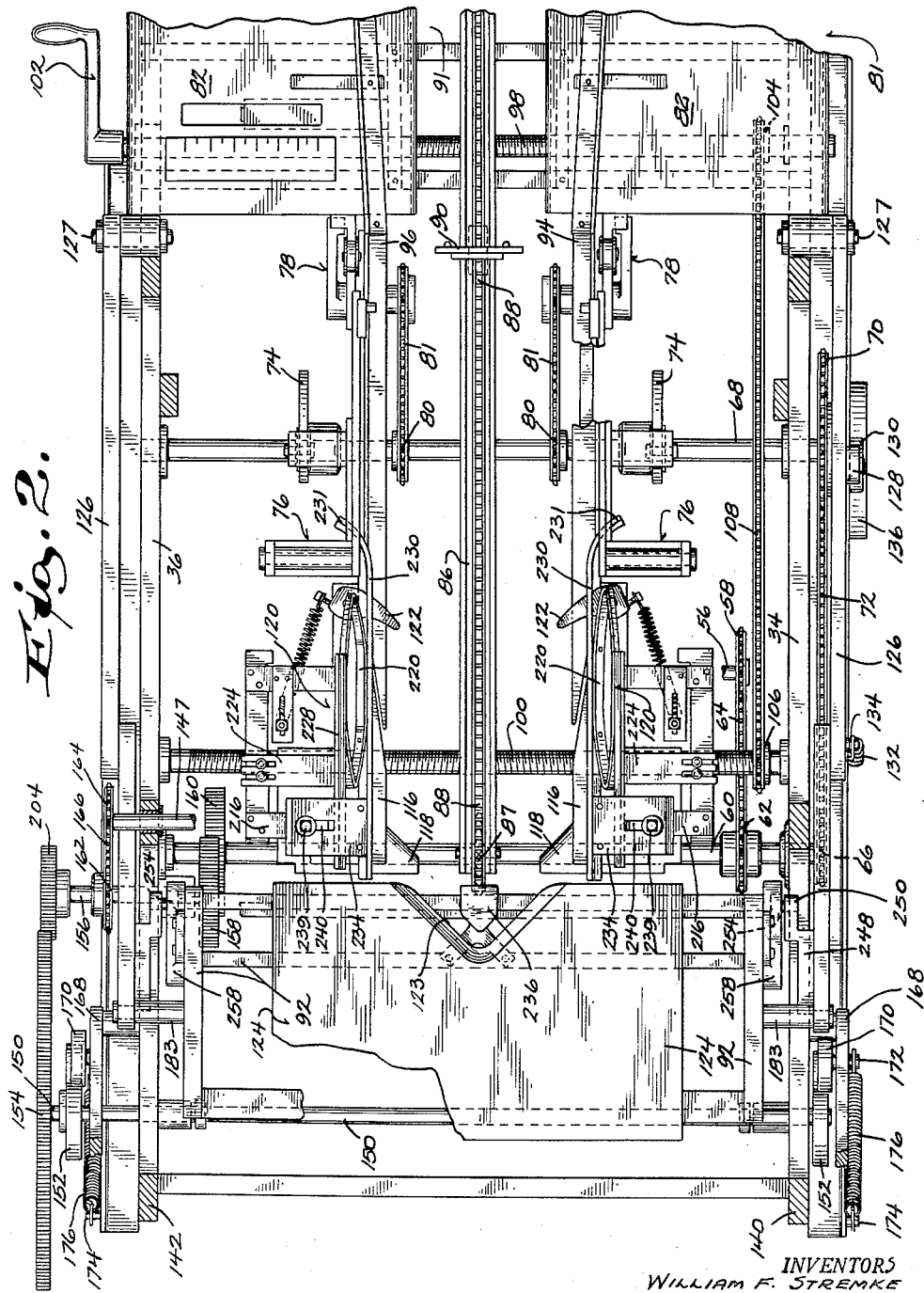

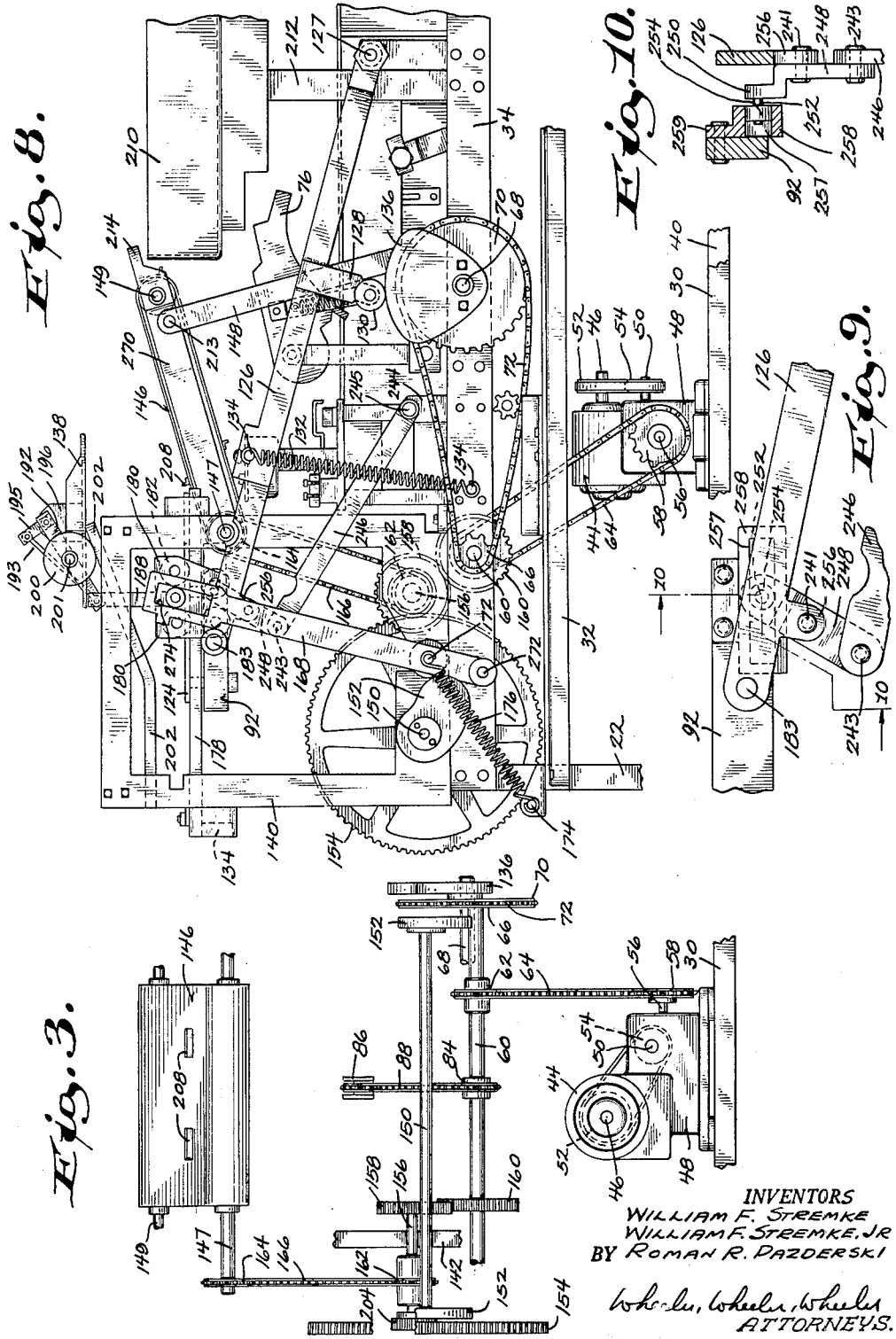

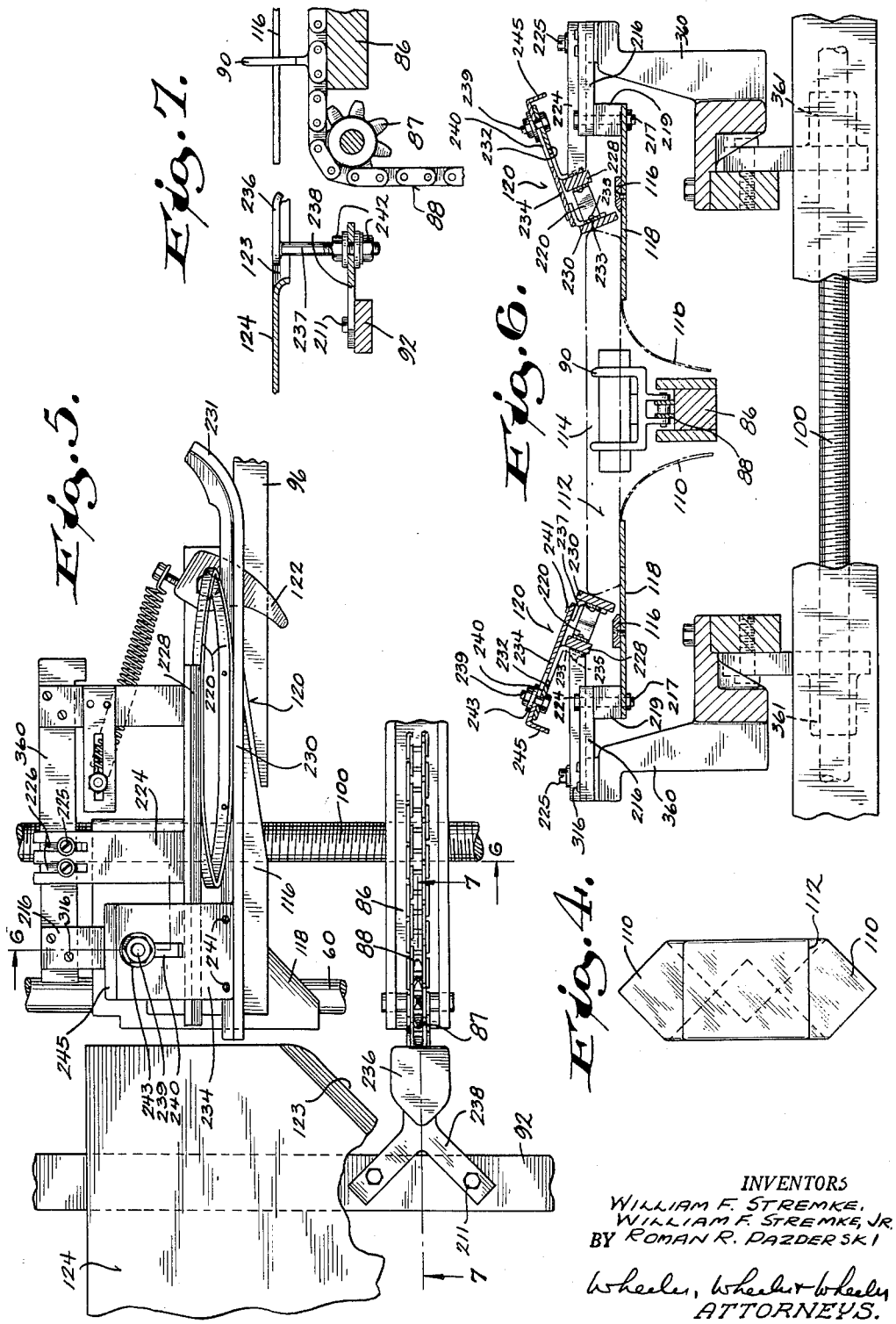

Jan. 16, 1962 W. F. STREMKE ET AL 3,016,671
WRAPPING MACHINE WITH RETURN CONVEYOR
Filed Sept. 25, 1959 7 Sheets-Sheet 5

INVENTORS
WILLIAM F. STREMKE
WILLIAM F. STREMKE, JR
BY ROMAN R. PAZDERSKI

Wheeler, Wheeler & Wheeler
ATTORNEYS.

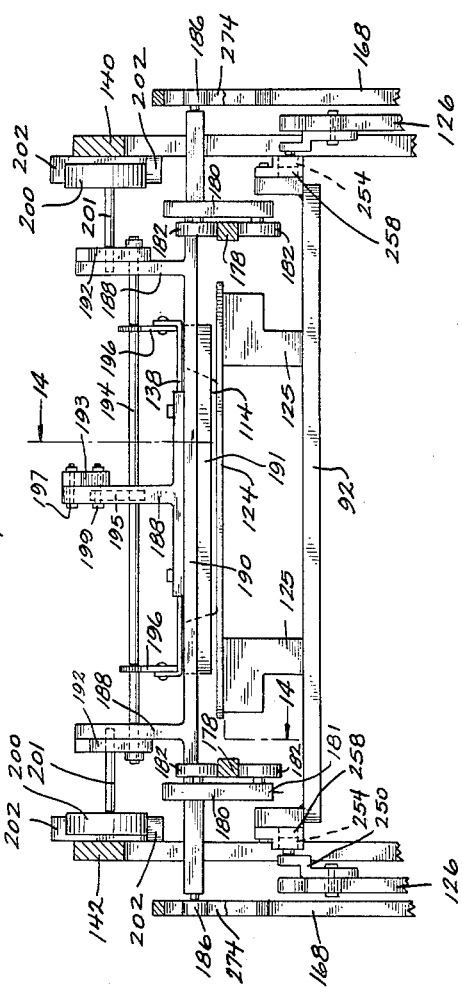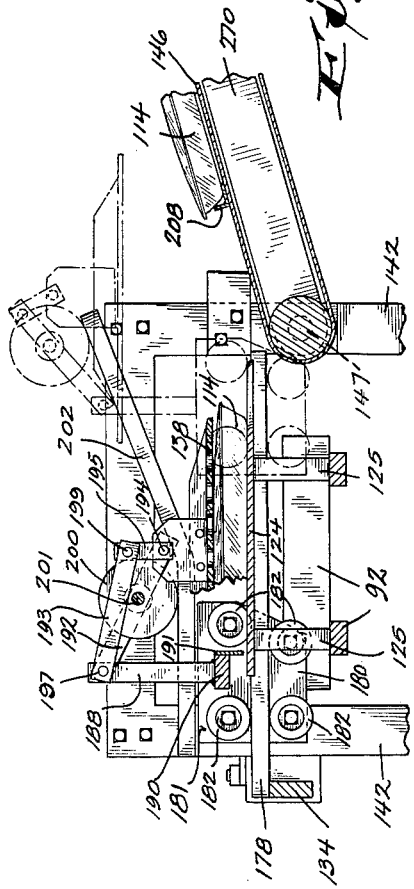

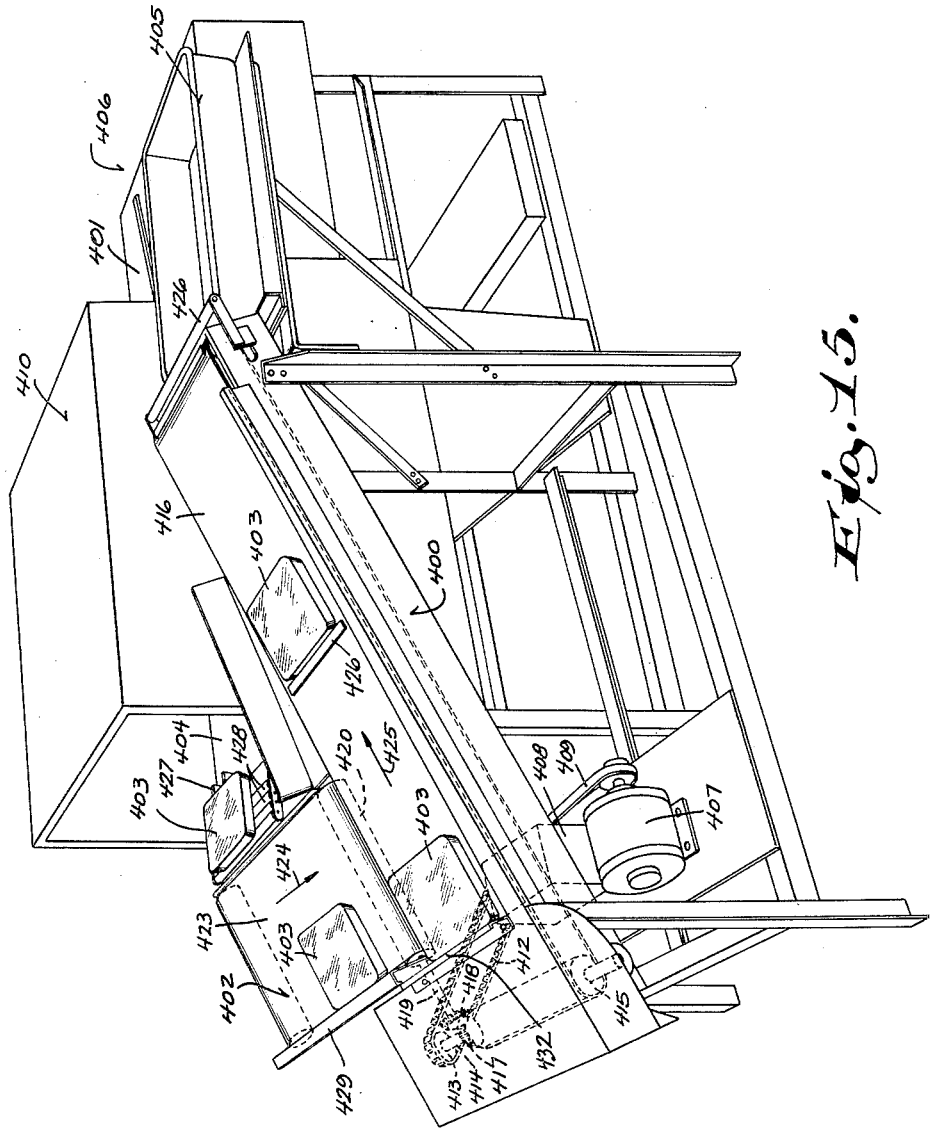

United States Patent Office 3,016,671
Patented Jan. 16, 1962

3,016,671
WRAPPING MACHINE WITH RETURN CONVEYOR
William F. Stremke, 8031 W. Holmes Ave., William F. Stremke, Jr., 3329 S. Springfield Ave., and Roman R. Pazderski, 3844 S. 15th Place, all of Milwaukee, Wis.
Filed Sept. 25, 1959, Ser. No. 842,513
11 Claims. (Cl. 53—206)

The present invention relates generally to wrapping machinery and more particularly to an improved machine for wrapping articles of merchandise.

The machine of the present invention is an improvement over the machine shown in our copending United States application Serial No. 711,308 filed January 27, 1958, in which a wrapped package is delivered to a tray at the end of the machine remote from the operator. The machine of the present invention is provided with additional mechanism including an elevating device and a return conveyor for returning the package to the operator. Accordingly, the operator who loads the machine can also unload it, thus eliminating the additional personnel previously needed to unload the wrapped products from the finish end of the machine.

In addition, the machine of the present invention includes improvements in the package feed and guide mechanism, and in particular incorporates a resilient guide which will yield to handle packages of different sizes. The guide is biased to hold the package against the pressure of a bottom folder.

Figure 1:
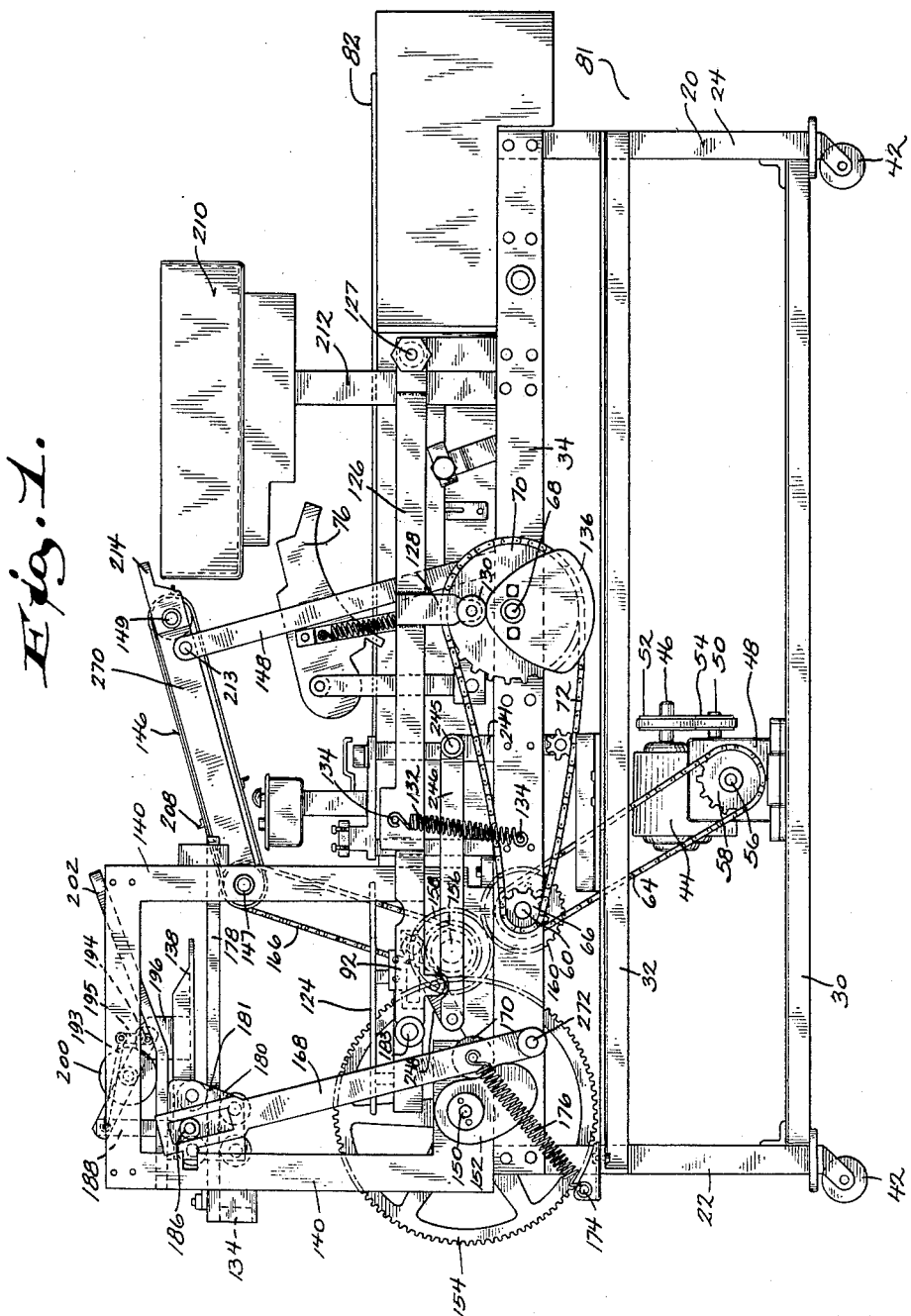
Figure 11:
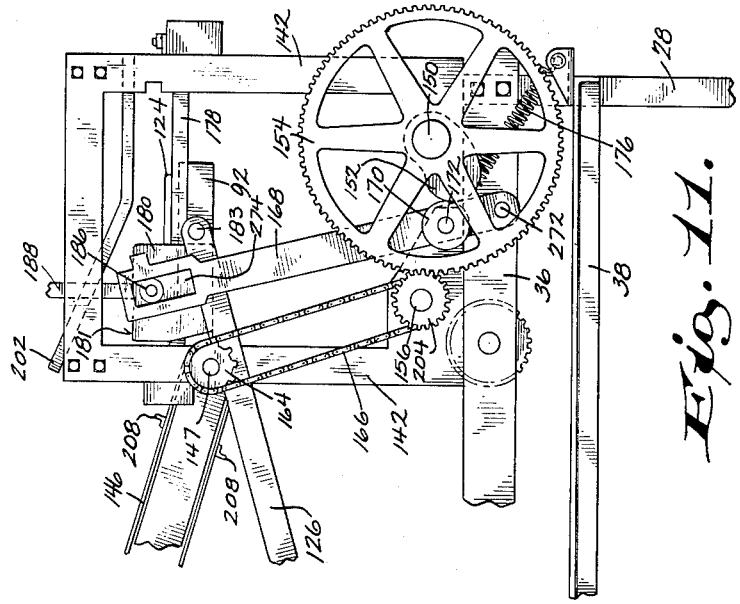
Figure 12:
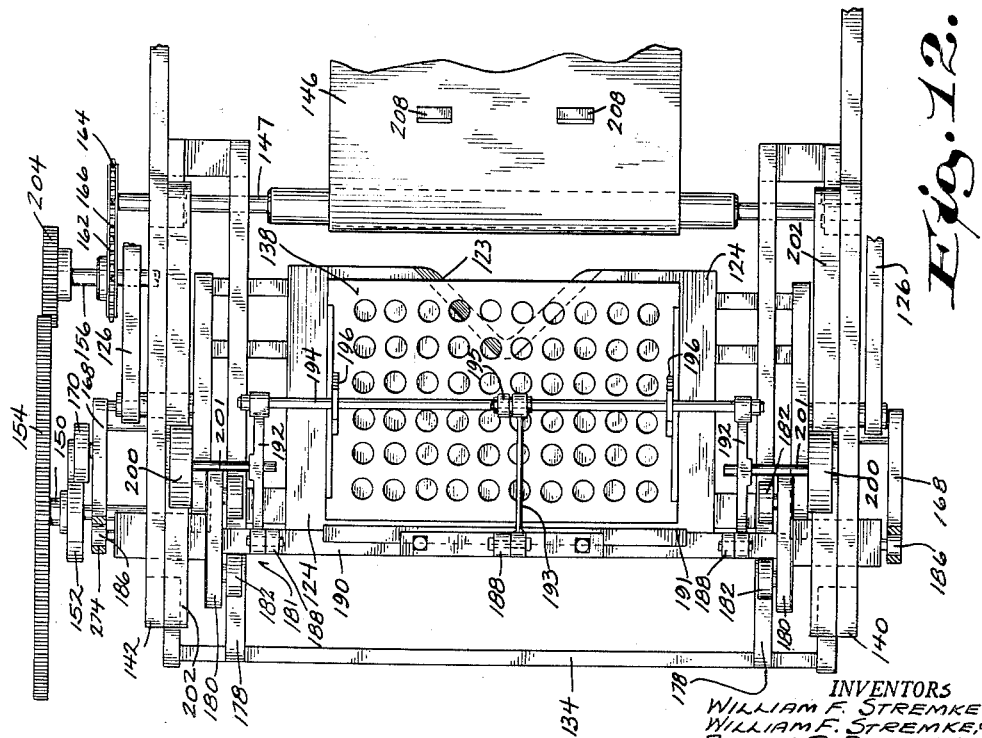

In the drawings:
FIG. 1 is a side elevational view of a machine embodying the instant invention.
FIG. 2 is a plan view of the machine shown in FIG. 1 with a portion of the starting end of the machine broken away.
FIG. 3 is an end view of the machine-driving mechanism.
FIG. 4 is a plan view of a partially wrapped package prepared for entry into the machine.
FIG. 5 is an enlarged fragmentary plan view of a portion of FIG. 2.
FIG. 6 is a vertical sectional view through FIG. 5 taken on line 6—6.
FIG. 7 is a vertical sectional view taken along line 7—7 of FIG. 5.
FIG. 8 is a fragmentary side elevational view of the machine, the operative mechanism being shown in a different position from that shown in FIG. 1.
FIG. 9 is an enlarged view of a portion of the mechanism of FIG. 8 exposing details of construction.
FIG. 10 is a view taken along the line 10—10 of FIG. 9.
FIG. 11 is a fragmentary side elevational view of the machine similar to FIG. 8 but from the opposite side.
FIG. 12 is a plan view of one end of the machine.
FIG. 13 is an end view of the machine.
FIG. 14 is a sectional view taken on line 14—14 of FIG. 13.
FIG. 15 is a perspective view of another embodiment of the present invention.

The wrapping machine shown generally in FIG. 1 has a frame 20 including upright support members 22, 24 and 28 and horizontal support members 30, 32, 34, 36 and 38. The upright support members 22, 24, and 28 have casters or rollers 42 mounted at the lower ends to make the machine portable.

An electric motor 44 is mounted on the horizontal support members 30 and 40 and has an output shaft 46. A gear reduction unit 48 is mounted below motor 44 and has an input shaft 50 corresponding to motor output shaft 46. Pulley 52 mounted on the motor shaft 46 and another pulley 54 on gear reduction input shaft 50 are drivingly interconnected by a belt. Pulley 52 may be adjusted in a well-known manner to infinitely vary the speed of the machine.

The gear reduction unit 48 has an output shaft 56 including a sprocket 58 keyed thereon. Horizontal support members 34 and 36 support a shaft 60 journaled therein and on which a sprocket 62 is mounted. A chain 64 drivingly interconnects sprocket 58 with a sprocket 62.

A sprocket 66 is keyed to the shaft 60. A second shaft 68 is journaled in and supported by frame members 34 and 36 and is parallel to and horizontally spaced from shaft 60. A sprocket 70 is keyed to shaft 68 and is drivingly interconnected with sprocket 66 by a chain 72. The power from electric motor 44 is thereby transmitted across the described mechanism to second shaft 68.

As is also shown in our copending application aforesaid, a pair of cams 74 are fixed eccentrically on shaft 68 to rotate with it and operate a pair of folders 76. Shaft 68 also serves to operate a pair of tuckers 78, motion being transmitted thereto by chains 81 engaged about sprockets 80.

The machine shown in the drawings is of the semi-automatic type in that at least one hand-wrapping operation is performed on the package before it is placed in the machine. The hand operation includes making an initial wrap of material around the material in a tray and heat sealing it, leaving it as shown in FIG. 4. See our U.S. Patent No. 2,840,962. The partially wrapped packages are placed manually on reception tables 82 mounted on frame members 34 and 36. For this purpose the operator stands at operator station 81.

Drive sprocket 84 mounted on shaft 60 and idler sprockets 87, and an elongated channel-shaped support trough 86 respectively propel and guide main conveyor chain 88. Conveyor chain 88 has a series of lugs or article pushers 90 (FIG. 6) attached thereto. The path of travel of the chain 88 extends from a point between the reception tables 82 to a transfer mechanism including heated elevating table 124. During the course of the travel of the conveyor chain 88 a pusher 90 intercepts the partially wrapped package which is manually placed to span the gap 91 between tables 82 and in the path of pusher 90. A pair of angle iron guide rails 94, 96 extend from reception tables 82 to transfer table 124 and are parallel excepting at their ends attached to the reception tables 82 where they diverge toward the tables.

Guide rails 94, 96 are adjustable to accommodate variations in the size of packages. For that purpose, two screw axles 98, 100, each threaded one-half left-hand thread and one-half right-hand thread, and journaled for free rotation on side supports 34 and 36, threadedly engage the rails 94, 96 to concurrently advance or retract the rails with respect to chain 88. Hand crank 102 is provided for turning the screw axle 98 closest to the machine operator. A pair of sprockets 104, 106 mounted respectively on screw axles 98 and 100 are interconnected by chain 108 to rotate screw axle 100 identically with axle 98.

As is also explained in our copending application aforesaid, one of the functions of the machine is to fold the extending portions 110 of the wrap shown in FIG. 4 downwardly and thence underneath and against the bottom of the package contents, such as tray 112 in which a food product such as meat is carried.

As the package leaves reception tables 82, the first operation is performed in which tabs of tuckers 78 move the trailing edges of the extending portions 110 of the wrapping material downwardly to draw the wrapping material tightly about the trailing rounded corner of tray 112. The arms of folders 76 then draw the extending portions 110 of the wrapping material downwardly around the sides of tray 112. The timing of the machine is such that the down-folding operation occurs while the tabs (not shown) on tuckers 78 are engaged with the trailing edges of the wrapping material so that a neat and tight tuck is made around the corners of tray 112.

Underfolders or plows 116 are provided to engage with the downwardly folded extended portions 110 of the wrapping and fold them under and against the bottom of tray 112. Underfolding plates 118 engage with the underside of tray 112 to complete the folding and heat is supplied thereto to fuse the thermoplastic wrapping snugly about the package, thereby sealing package contents from exposure to the atmosphere.

As the package moves toward the underfolders 116, its front corners are engaged by a pair of heated front tuckers 122 which press the wrapping material tightly about the front rounded corners of tray 112 and fuse it in place. The pressure exerted against the bottom of the package by the action of the underfolders 116 in folding extending portions 110 under tray 112 is great enough to tend to lift the package. To hold the package down against the underfolders 116 and insure a firm contact between the bottom of the tray 112 and the underfolders 116, we provide guides 120.

Guides 120 are clearly illustrated in FIGS. 5 and 6. Guide support arms 360 are connected to sleeves 361 threaded to oppositely pitched portions of screw axle 100. Support arms 360 will be moved toward or away from conveyor 88 by selectively rotating axle 100 in one direction or the other.

Each support arm 360 carries on pins 316 a bracket plate 216. Each plate 216 has dependent therefrom an elongated mounting bolt 217 which passes through spacer block 219 to support undertucker 116 and underfolding plate 118 below plate 216.

Each support arm 360 also serves as a mount for one end of an adjustable guide mounting bracket 224. Bracket 224 is adjustably secured to support 360 by screws 225 through slots 226 in the end of bracket 224. At the other end of bracket 224 a transverse bar 228 is attached. Bar 228 is fastened to bracket 224 to face obliquely downward towards conveyor 88. Package biasing shoe 230 is mounted in parallel relation with respect to bar 228 by means of intervening leaf spring support 220.

Each shoe 230 has its leading end 231 curved to define a throat into which the package is advanced by the conveyor 88. Each shoe 230 will yield under pressure of the package 114 obliquely upwardly against the bias of gravity and the pressure of springs 220, depending on the width of the package and the upward thrust caused by the action of the bottom folders 116, 118. After the package has passed beyond the trailing end of shoes 230, gravity and the pressure of springs 220 will restore the shoes 230 to extended position in readiness to exert holding pressure on the next succeeding package.

The extended position of shoes 230 is limited by the slide plates 232, 234 connected respectively to the support bar 228 and shoe 230 near the trailing end of shoe 230 and offset toward said trailing end from the spring 220. Plate 232 has a flange 233 fastened by bolts 235 to bar 228 and plate 234 is fastened by bolts 241 to angle bracket 237 in turn bolted to the inner face of shoe 230.

Plate 232 supports a bolt 239 which extends through slot 240 in plate 234 and which has a washer 243 overlying the plate 234. Bolt 239 is sufficiently loose so that the respective plates 232, 234 can slide to permit limited movement between the shoe 230 and bar 228. The sliding face engagement of plates 232, 234 and washer 243 constrains the shoe 230 for rectilinear movement. Plate 234 may also be provided with flange 245 to abut the upper end of plate 232 and thus positively limit the extension of spring 220.

Pusher 90 pushes the wrapped package 114 over folder plates 118, onto a heated elevating table 124 which is supported on legs 125 (FIG. 13) from subframe 92. The folding of the package is completed in a triangular shaped notch 123 formed in the margin of table 124. Heat supplied from table 124 completes the fusing of the wrapper.

In order to assist in the transfer of the package 114 from conveyor 88 to table 124, a skid 236, best shown in FIGS. 4 and 7, is located centrally within the V-shaped notch 123 in the table 124.

Skid 236 is supported on a yoke arm 238 fastened by bolts 211 to subframe 92. As shown particularly in FIG. 7, skid 236 is mounted on a screw threaded stem 237 which is hand adjustable to be set at the height required to smoothly transfer the package onto table 124. Screw 237 can be locked in the selected position by lock nuts 242.

The various aforedescribed tucking and folding mechanisms are connected to the drive shaft 60 by power transmission means such as chains, gears and cams. The mechanisms which are heated have heating coils connected to a source of electricity. The structure and operation of these conventional mechanisms is also shown in our copending application aforesaid. As they constitute no part of the present invention, they will not be further described herein.

The structure described thus far deals primarily with the wrapping operation of the machine. An important feature of the instant invention is apparatus for returning the wrapped package to the machine operator at station 81 approximately at its point of entry into the machine. This apparatus includes a return conveyor and mechanism to transfer the package thereto.

The previously described heated elevating table 124 is supported on a subframe 92 (FIGS. 1 and 8) which is provided on each side with a pivotally mounted elevating arm 126. Elevating arms 126 are pivotally mounted at one end on pins 127 to frame members 34, 36 and at the other end on pins 183 to subframe 92.

Each elevating arm 126 is provided intermediate its ends with a downwardly extending cam follower elbow 128. Elbow 128 has a cam follower roller 130 rotatably mounted thereon. Rollers 130 bear on eccentrically mounted cams 136 to lift and lower elevating arms 126 in response to the contour of cams 136 and pursuant to rotation of shaft 68.

In addition to the gravity bias of arms 126 to lowermost position, we provide springs 132 to bias arms 126 in a counterclockwise direction as viewed in FIGS. 1 and 8. Springs 32 are connected on pins 134 respectively to arms 126 and frame members 34, 36.

Subframe 92 is maintained level by linkage apparatus best shown in FIGS. 8 and 9. Link 246 is pivotally mounted on pin 245 to tab 244 extending upwardly from frame member 34. The other end of link 246 is pivotally connected on pin 243, on one end of another link 248. The other end of link 248 is provided with ear 250 (FIG. 10) having a pin 252 rotatably supporting roller 254 which may travel in lost motion channel 257 in track member 258 fixed to side 259 of subframe 92. Intermediate its ends link 248 is pivotally attached on pin 241 to an ear 256 of arm 126. The purpose of the structure shown is to maintain subframe 92 and table 124 level while being elevated. As arm 126 is swung about pivot 127, links 246, 248 move roller 254 along channel 257 to thereby shift the point along the track at which roller 254 cooperates with fixed pivot pin 183 to support table 92.

Upwardly extending from frame members 34 and 36 are side frames 140 and 142. Cross brace 134 interconnects side frame members 140 and 142.

Elevator table 124 raises packages 114 from the level of the discharge end of conveyor 88 to the level of the input end of upwardly inclined return belt conveyor 146 which is supported at its lower end by an axle 147 journaled in side frames 140 and 142. Return belt conveyor 146 is supported at its higher end from frame members 34, 36 by braces 148 fastened on pins 213 to side plates 270 on which axle 149 for the other end of the belt is journaled.

Return conveyor 146 is driven to convey packages oppositely to those carried on main conveyor 88. The driving connections, best shown in FIG. 3, include sprocket 164 on conveyor shaft 147 interconnected by chain 166 to sprocket 162 on stub shaft 156 which is journaled on frame 142. Shaft 156 carries gear 158 which meshes with gear 160 on power shaft 60.

Transfer mechanism is provided to apply a light downward pressure to and then transfer the package from elevated heated elevating table 124 to conveyor 146. The light pressure is desired to complete the sealing operation. The transfer mechanism comprises a pair of oscillating pivot arms 168 (FIGS. 1, 8 and 11) each having a lost motion channel 274 at one end. Arms 168 are pivotally mounted on pins 272 at their other ends on frame members 34, 36. Intermediate the ends of bars 168 cam follower rollers 170 are rotatably mounted on pins 172. Rollers 170 ride on cams 152 fixed on the ends of cross shaft 150 having gear 154 meshing with gear 204 on jack shaft 156. Rollers 170 on arms 168 are biased toward engagement with the cams 150 by springs 176 which extend between pins 172 and pins 174 mounted on frame members 32, 36.

As best shown in FIGS. 1, 13 and 14, arms 168 actuate reciprocating transfer carriages 181 mounted at both sides of the machine on rectilinear tracks 178 supported on side frames 140 and 142 at the level of the input end of conveyor 146. The transfer carriages carry mechanism to push packages from the elevated table 124 onto conveyor 146.

Each carriage 181 comprises a plate 180 having four support rollers 182. Two rollers 182 ride against the top surface of track 178 and two rollers 182 ride against the bottom surface of track 178, thus to constrain the carriages to rectilinear movement. As best shown in FIG. 13 each plate 180 is provided with an outwardly extending motion-receiving arm having a roller 186 which rides in the lost motion channel 274 of arm 168. The lost motion of roller 186 in channel 274 accommodates for the transfer of oscillatory movement from the arms 168 to the rectilinear motion of the carriages 181.

Carriages 181 are cross connected by frame 190 from which three laterally spaced posts 188 extend upwardly. At its side facing the package 114, frame 190 carries a package push plate 191. Each end post 188 is provided with a link 192 pivoted on pin 191 at one end to the post and fixedly mounted at its other end to a pivot rod 194 which interconnects the links 192. Another link 193 is pivotally connected on pin 197 at one end to center post 188 and at its other end on pin 199 to one end of a third link 195. At the other end, link 195 is pivoted to the mid point of rod 194. Perforated pressure plate 138 is suspended pivotally from rod 194 on ears 196 and will be biased by gravity to rest on the top of package 114 as shown in full lines in FIG. 14.

End links 192 are supported intermediate their length by cam follower wheels 200 mounted on shafts 201. Wheels 200 ride on cam tracks 202 fixed to upper machine frames 140 and 142.

Cam tracks 202 extend parallel to track 178 for a short distance near the rear of the machine and then incline upwardly from track 178 to a point above the top of side frames 140 and 142.

As the carriages 181 move rectilinearly along tracks 178, for example, from their positions shown in FIG. 1 to their positions shown in FIG. 8, cam follower wheels 200 follow the cam tracks 202, and through links 192 and pivot rod 194 raise pressure plate 138. This is also shown by the solid and broken line positions of the parts in FIG. 14. The interconnection of the parts is such that the elevation of table 124 is timed with the movement of the transfer mechanism so that the package on heated elevating table 124 will be engaged after the elevator table 124 has ascended. The plate 138 maintains the package in heat transfer relation to the table 124 while plate 191 concurrently pushes the package across the table 124 and towards conveyor 146. Pressure plate 138 will ultimately be raised off the package by the cam action of tracks 202. When the package approaches the broken line position of the parts shown in FIG. 14, it will be transferred to the upwardly inclined belt conveyor 146. Belt 146 has pusher legs 208 fixed thereto for positive pushing action against the package 114.

A package-receiving bin 210 is supported from frame members 34, 36 on legs 212. Bin 210 is located below the discharge end of conveyor 146. The package travels up conveyor 146, discharges onto apron 214 and drops into bin 210. Should the package fail to drop into bin 210, the pushers 208 will force the package off the apron 214. The bin 210 is above the reception tables 82, thereby enabling the operator of the machine to control both loading and unloading from the same position.

Another embodiment of the invention is shown in FIG. 15. In this embodiment the return conveyor 400 is mounted alongside the main conveyor 401, instead of over it as in the embodiment shown in FIGS. 1–14. The elevator 124 of the previously described embodiment is eliminated in favor of a package transfer mechanism comprising lateral belt conveyor 402 which transfers packages 403 from heat sealing plate 404 to the return conveyor 400 and thence back to a bin 405 which is adjacent the operator station 406.

Package-wrapping mechanism similar to that previously described and also shown in our copending application 711,308 aforesaid is enclosed in housing 410 alongside main conveyor 401. Conveyor 401 has pusher fingers 427 which ultimately deliver a wrapped package 403 to the hot plate 404 and thence over the transfer rollers 428 to the lateral conveyor 402.

Conveyors 400, 402 are driven from a motor 407 which drives through belt 409 a gear transmission in gear box 408. The gear box 408 has a power output shaft (not shown) which drives chain 412 which meshes with sprocket 413 on the shaft 414 of the drum 415 about which the belt 416 of belt conveyor 400 is trained. Shaft 414 is also provided with a gear 417 which drives bevel gear 418 mounted on shaft 419 for the drum 420 about which the belt 423 of lateral conveyor 402 is trained.

The top run of belt 423 is driven in the direction of arrow 424. The top run of belt 416 is driven in the direction of arrow 425. Return conveyor 400 is upwardly inclined from its input end adjacent the output end of belt 423. Accordingly, packages 403 on belt 416 are conveyed upwardly and over the discharge roller 426 at the output end of belt 416 and into the bin 405. Belt 416 is desirably provided with flights 426 which engage the packages 403 to prevent backsliding thereof.

Conveyor 402 is desirably downwardly and laterally inclined at substantially the same angle as belt 416 is longitudinally inclined. Accordingly, the packages 403 do not change inclination as they are transferred from belt 423 to belt 416.

The packages delivered to conveyor 402 slide by gravity down the lateral incline of belt 423 and collect against stop rail 429 against which they slide as they are conveyed onto belt 416 where they collect against stop rail 432 until picked up by a flight 426 on belt 416.

From the foregoing, it is clear that in both embodiments of the invention the main conveyor has its discharge or output end adjacent to the input end of the return conveyor. Transfer mechanism is provided to transfer the package from the output end of the main conveyor to the input end of the return conveyor. In the embodiment of the invention shown in FIGS. 1 through 14, the transfer mechanism comprises an elevator. In the embodiment of the invention shown in FIG. 15, the transfer mechanism comprises a lateral conveyor which is desirably inclined laterally at the same angle as the return conveyor is inclined longitudinally.

While machines are illustrated for wrapping food products and particularly perishables, it is to be understood that the illustrated machines are only preferred embodiments of the invention.

We claim:

1. The combination with a wrapping machine of the type described and which includes a first conveyor and means for folding ends of a thermoplastic wrapper beneath a package advanced by said conveyor, of an elevator onto which a wrapped package is deposited by said first conveyor with its folded ends between the package and elevator, said elevator comprising a heat sealing plate to fuse the wrapper ends, means to lift said elevator and the wrapped package to a higher level, a second conveyor supported above the machine and running in a direction opposite to the direction in which the first conveyor runs, means to transfer the package from the heat sealing plate onto the second conveyor, and means supported above the machine to receive the package from said second conveyor.

2. The combination with a wrapping machine of the type described and which includes a first conveyor, of an elevator onto which a wrapped package is deposited by said first conveyor, said elevator comprising a heat sealing plate, means to lift said elevator and the wrapped package to a higher level, a second conveyor supported above the machine and running in a direction opposite to the direction in which the first conveyor runs, means to transfer the package from the heat sealing plate onto the second conveyor and including a pusher plate and a pressure plate to maintain the package in heat exchange relative to the heat sealing plate concurrently with package transfer to the second conveyor.

3. The device of claim 2 in which the transfer means further comprises means to remove said pressure plate from engagement with the package in the course of package transfer to the second conveyor.

4. The device of claim 3 in which the last mentioned means comprises a track, support means for the pressure plate including wheels which run on said track, said track having an upwardly inclined portion up which said wheels run to remove the pressure plate from engagement with the package.

5. The combination with a wrapping machine of the type described and which includes a first conveyor, of an elevator onto which a wrapped package is deposited by said first conveyor, means to lift said elevator and package to another level, an upwardly inclined second conveyor supported above the machine and running upwardly in a direction opposite to the direction in which the first conveyor runs, means to transfer the package from the elevator onto the second conveyor, said second conveyor comprising package-engaging fixtures, an apron at the end of the second conveyor and a bin supported above the machine and into which packages are pushed over said apron by said fixtures.

6. In a machine in which a wrapper is folded between a package and folding plates therebeneath while it travels longitudinally along a first conveyor, the folding of the wrapper between the package and plates causing the package to rise with respect to said plates, resilient package guides adjacent the margins of said first conveyor, said guides being obliquely upwardly yieldable to accommodate packages of varying lateral dimension and to accommodate for the rise of the package while permitting continued longitudinal movement of the package, said guides exerting an oblique downward force to bias the wrapper portions between the package and plates against the plates notwithstanding the rising of the package, an elevator onto which a wrapped package is deposited by the first conveyor, means to lift said elevator and package to another level, a second conveyor supported above the machine and running in a direction opposite to the direction in which said first conveyor runs, means to transfer the package from the elevator onto said second conveyor, and means supported above said machine to receive the package from said second conveyor.

7. In a machine in which a wrapper is folded between a package and folding plates therebeneath while it travels longitudinally along a first conveyor, the folding of the wrapper between the package and plates causing the package to rise with respect to said plates, resilient guides mounted on said machine adjacent the margins of said conveyor, said guides being obliquely upwardly yieldable to accommodate packages on said conveyor of varying lateral dimensions and to accommodate for the rise of the package while permitting continued longitudinal movement of the package, said guides exerting an oblique downward force to bias the wrapper portions between the package and plates against the plates notwithstanding the rising of the package.

8. The device of claim 7 in which said guides comprise elongated package-engaging shoes and means on which said shoes are guided for yielding movement obliquely and laterally upwardly with respect to the path of the package.

9. The device of claim 8 in which said guide means comprises a pair of slidably related guide plates and a spring interconnecting said plates.

10. A wrapping machine comprising a first conveyor having a package input end adjacent a machine operator station, and an output end remote from said station, package wrapping means along said first conveyor, a second conveyor having its input end adjacent the output end of the first conveyor and its output end adjacent said station, and package transfer means adjacent the output end of the first conveyor and the input end of the second conveyor to transfer wrapped packages from the first conveyor to the second conveyor for return to said station, said second conveyor being substantially over the first conveyor, said transfer means comprising an elevator onto which said first conveyor delivers said package, means for lifting the elevator and package to the level of the input end of the second conveyor, and means for transferring packages from the elevator to the second conveyor, said elevator comprising a heating element for heat sealing the wrapper of the package in the course of transfer of the package from the level of the first conveyor to the level of the second conveyor, said means for transferring the package from the elevator to the second conveyor comprising a package pusher and a presser plate for biasing the package against the heated elevator.

11. A wrapping machine comprising a first conveyor having a package input end adjacent a machine operator station, and an output end remote from said station, package wrapping means along said first conveyor, a second conveyor having its input end adjacent the output end of the first conveyor and its output end adjacent said station, and package transfer means adjacent the output end of the first conveyor and the input end of the second conveyor to transfer wrapped packages from the first conveyor to the second conveyor for return to said station, said first and second conveyors being side by side, said package transfer means comprising a lateral conveyor between the output end of the first conveyor and the input end of the second conveyor, said first conveyor being substantially horizontal, said second conveyor being upwardly inclined from its input end to its output end and said lateral conveyor being laterally inclined at substantially the same angle as said second conveyor.

References Cited in the file of this patent

UNITED STATES PATENTS

| | | |
|---|---|---|
| 1,266,705 | Murphy | May 21, 1918 |
| 1,618,217 | Kimball | Nov. 23, 1926 |
| 1,902,734 | Streng | Mar. 21, 1933 |
| 1,969,581 | Rose | Aug. 7, 1934 |
| 2,917,885 | Stremke | Dec. 22, 1959 |
| 2,917,886 | Stremke | Dec. 22, 1959 |